United States Patent [19]

Kitsukawa

[11] Patent Number: 4,768,677
[45] Date of Patent: Sep. 6, 1988

[54] FUEL TANK CAP

[75] Inventor: Akira Kitsukawa, Ayase, Japan

[73] Assignee: Nihon Radiator Co., Ltd, Tokyo, Japan

[21] Appl. No.: 111,728

[22] Filed: Oct. 21, 1987

[30] Foreign Application Priority Data

Oct. 21, 1986 [JP] Japan .............................. 61-250547
Jun. 26, 1987 [JP] Japan .............................. 62-158932

[51] Int. Cl.$^4$ ............................................ B65D 41/04
[52] U.S. Cl. ................................... 220/288; 220/304; 220/DIG. 33
[58] Field of Search ................ 220/288, 304, DIG. 33

[56] References Cited

U.S. PATENT DOCUMENTS

| | | | |
|---|---|---|---|
| 4,228,915 | 10/1980 | Hooper et al. | 220/304 |
| 4,494,673 | 1/1985 | Hirashi | 220/304 |
| 4,579,247 | 4/1986 | Hasui et al. | 220/288 |
| 4,678,097 | 7/1987 | Crute | 220/288 |

Primary Examiner—George T. Hall
Attorney, Agent, or Firm—Horst M. Kasper

[57] ABSTRACT

The invention relates to a fuel tank cap comprising a body, the upper portion of which is provided with a hole. Said hole exhibits a plurality of concave or convex sections which are formed along the inner periphery of the hole. A cover comprises a sleeve, which is formed on the inner periphery of the cover for insertion into the hole of the body, and has a plurality of axial slits. The sleeve is provided with a plurality of convex or concave sections formed along its outer periphery so as to mate with the concave or convex sections of the hole, respectively. When a clamping torque applied on the cap exceeds a predetermined value, an idle-rotation mechanism is established between the sleeve and the hole. The fuel tank cap and, more particularly, such a type of cap can effectively prevent the leakage of fuel in a vehicle fuel tank when the vehicle collides with another vehicle or object.

2 Claims, 7 Drawing Sheets

FUEL TANK CAP

DETAILED DESCRIPTION OF THE INVENTION

The present invention relates to a fuel tank cap and more particularly to such type of cap that can effectively prevent the leakage of fuel in a vehicle fuel tank when the vehicle collides against another vehicle or object.

Generally, there is arranged on the fuel tank of an automobile a tank cap of the type as disclosed in Japanese Laid-Open Utility Model Publication No. 60-2653, for example.

Figure 10:
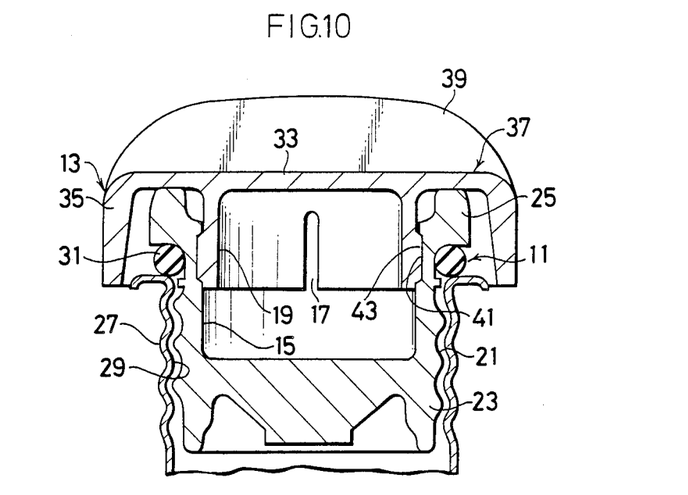
FIG. 10 is a vertical sectional view of a conventional fuel tank cap.

FIG. 10 shows the fuel tank cap disclosed in the above publication. It comprises a cap body 11 and a cover 13.

On the upper part of the cap body 11 there is formed a hole 15 into which is inserted a sleeve 19 having a plurality of slits formed in the inner peripheral portion of the cover 13.

The cover body 11 comprises a tubular section 23 having a screw-threaded section 21 on the outer periphery thereof and containing therein a valve mechanism (not shown), and a short tubular flange section 25 having a diameter larger than that of the tubular section 23 and formed integral with the tubular section 23.

The tubular section 23 and the flange section 25 are made of a synthetic resin material and integrally connected with each other as described above.

Further, the cap body 11 is held engaged with a filler neck 27 by fitting the screw-threaded section 21 into a screw-threaded section 29 of the filler neck 27 and between the filler neck 27 and the flange section 25 of the cap body 25, there is arranged an O-ring 31.

The cover 13 comprises a top plate 37 formed of a plate-like section 33 and an annular side wall 35 extending downward vertically from the outer periphery of the plate-like section 33, a handle section 39 formed integral with the upper surface of the top plate 37 and the sleeve 19 formed integrally on the lower surface of the top plate 37 in concentric relationship with the hole 15 so as to extend downward and having a plurality of slits 17.

In the case of such fuel tank cap of the conventional type, a plurality of concave section 14 are formed along the inner periphery of the hole 15 of the cap body 11 so as to make fits with a plurality of convex sections 42 formed along the outer periphery of the sleeve 19 of the cover 13, respectively, whereby an idle-rotating machanism is formed which causes the cover 13 to rotate idly when a clamping torque exceeding a predetermined value is applied.

Thus, in the case of the fuel tank cap of the above structure, it is possible to control the torque applied at the time of fitting the cap body 11 on the filler neck 27 due to the provision of the idle-rotation mechanism and at the same time, since the sleeve 19 of the cover 13 deforms with ease due to the existence of the slits 17 when an external force exceeding a predetermined value is applied on the cover 13, the concave sections 41 are disengaged from the convex sections 43 allowing only the cover 13 to separate while the cap body 11 is held fixed to the filler neck 27 so that the leakage of the fuel from the tank is prevented.

However, this type of cap has had a problem that as shown in FIG. 10, when a force is applied on the cap body 11 in a direction in which the cover 13 inclines, the cover 13 tends to become disengaged from the cap body 11.

For example, when the cover 13 is rotated by holding the side wall thereof instead of grasping the handle 39 of the cover 13, the sleeve 19 reduces its diameter in a state in which the cover 13 begins to rotate idly and if, in this case, a tensile force is applied on the cover 13, it tends to become disengaged from the cap body 11 by a comparatively small force.

Further, even where the cover 13 is rotated with the handle 39, the diameter of the sleeve 19 reduces in a state in which the cover 13 begins to rotate idly and should an off-centered force is applied on the cover 13 in this case, the cover 13 also tends to become disengaged from the cap body 11.

Figure 11:
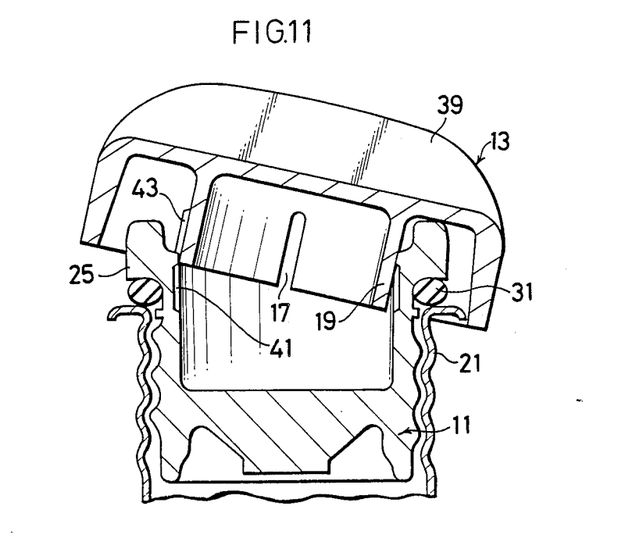
FIG. 11 is an illustrative view of a state in which a cover of the fuel tank cap shown in FIG. 10 is inclined.

In addition, the conventional fuel tank cap has the disadvantage that as shown in FIG. 10, the upper end of the flange 25 is in direct contact with the portion of the top plate 33 between the sleeve 19 and the side wall 35 so that when the cover 13 inclines in the manner shown in FIG. 11, a concentrated load will be applied on a portion of the top plate 33 causing the cover 13 to rupture.

Accordingly, an object of the present invention is to provide a fuel tank cap capable of holding a cover of the cap engaged accurately with the body of the cap.

Another object of the present invention is to provide a fuel tank cap of the type that assures the accurate separation of a cap cover from the cap when a strong impact is applied on the cap at the time of collision of the vehicle against another vehicle or object by applying a concentrated load upon a high-strength portion of the cover thereby preventing the breakage of the cover.

EMBODIMENT OF THE INVENTION

One embodiment of the present invention shown in the drawings will now be described in detail.

Figure 1:
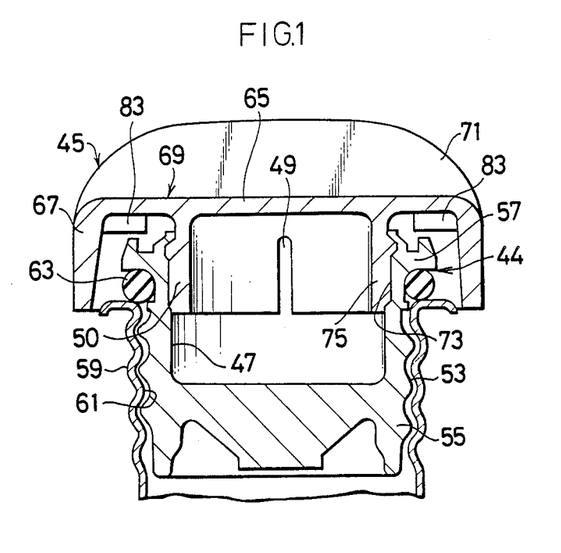
FIG. 1 is a vertical sectional view of an embodiment of a fuel tank cap according to the present invention.

In FIG. 1, a fuel tank cap comprises a cap body 44 and a cover 45.

The cap body 44 is provided with a hole 47 at the upper part thereof and a sleeve 50 formed within the inner periphery of the cover 45 and having a plurality of slits 49 extending in the axial direction is fitted into hole 47.

The cap body 44 comprises a tubular section 55 having a screw-threaded poriton 53 on the outer periphery thereof and containing a valve mechanism therein), and a short tubular flange section 57 having a diameter larger than the outer diameter of the tubular section 55 and integrally formed with the latter.

The tubular section 55 of the cap body 44 and the flange 57 are made of a synthetic resin material and formed integral with each other as already described.

The cap body 44 is held engaged with a filler neck 59 by inserting the screw-threaded section 53 thereof into a screw-threaded section of the filler neck 59. Further, there is arranged an O-ring 63 between the filler neck 59 and the flange section 57 of the cap body 44.

The cover 45 comprises a top plate 69 including a plate-like section 65 covering the cap body 44 and an annular side wall 67 extending downward from the outer periphery thereof, a handle section 71 integrally formed with the upper surface of the top plate 69 and the sleeve 50 integrally formed with the lower surface of the top plate 69 so as to extending downward in concentric relationsihp with the hole 47 and having the plurality of slits 49.

In the case of this type of fuel tank cap, there are formed a plurality of concave sections 73 along the inner periphery of the hole 47 in the cap body 44 and a plurality of convex secitons 75 formed along the outer periphery of the sleeve 50 so as to make fits with the sections 73, respectively, whereby an idle-rotation mechanism is formed to cause the cover 45 to rotate when a clamping torque exceeding a predetermined value is applied.

Figure 2:
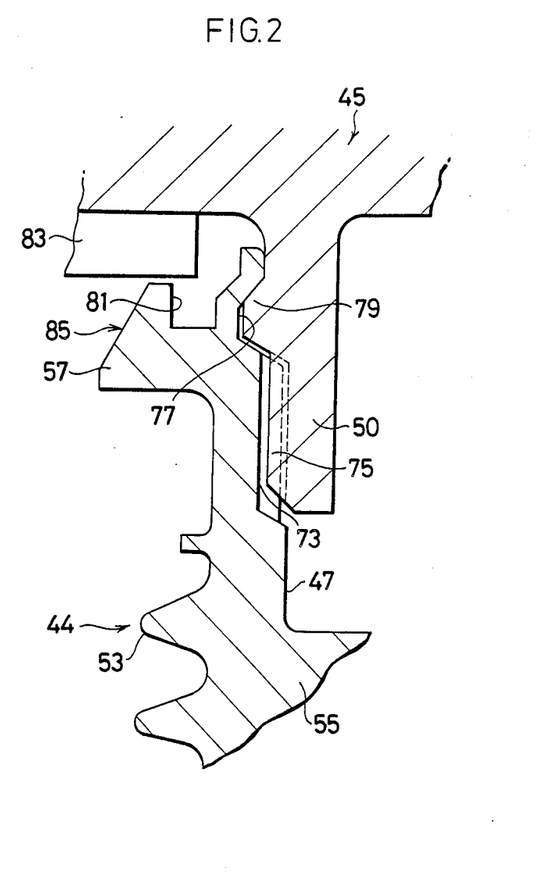
FIG. 2 is a vertical sectional view showing details of annular concave sections and concave sections fitting in the formers shown in FIG. 1.

Further, in the instant embodiment, there are formed an annular concave section 77 along the inner periphery of the hole 47 of the cap body 44 and a convex section 79 formed on the outer periphery of the sleeve 50 is fitted into the former shown in FIG. 2.

That is, on the upper portion of the concave sections 73 formed along the inner periphery of the hole 47 of the cap body 44, there is formed the trapezoidal annular concave section 77 along the inner periphery of the hole 47. Further, in the flange section 57 of the cap body 44 there is formed a groove 81 so that the trapezoidal annular concave section 77 is easily deformed in the radial direction of the cap body 44.

At the same time, above the convex sections 75 along the outer periphery of the sleeve 50 there is formed the convex section 79 which is complementary to the annular concave section 77 so as to fit in the latter.

Figure 3:
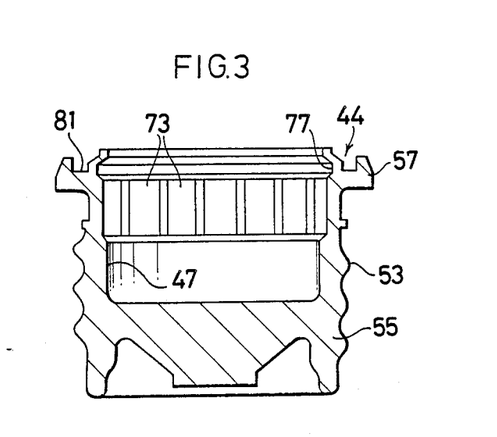
FIG. 3 is a vertical sectional view of the cap shown in FIG. 1.
Figure 4:
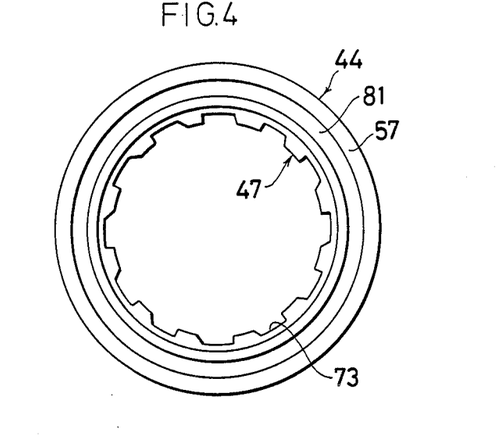
FIG. 4 is a front view of the cap shown in FIG. 3.

FIGS. 3 and 4 show the cap body 44 of the present invention in detail wherein reference numeral 73 designates the plurality of concave sections formed along the inner periphery of the holw 47 in the cap body 44.

Figure 5:
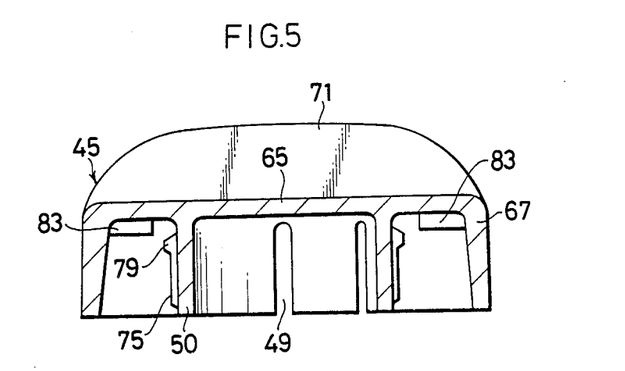
FIG. 5 is a vertical sectional view of a cap cover shown in FIG. 1.
Figure 6:
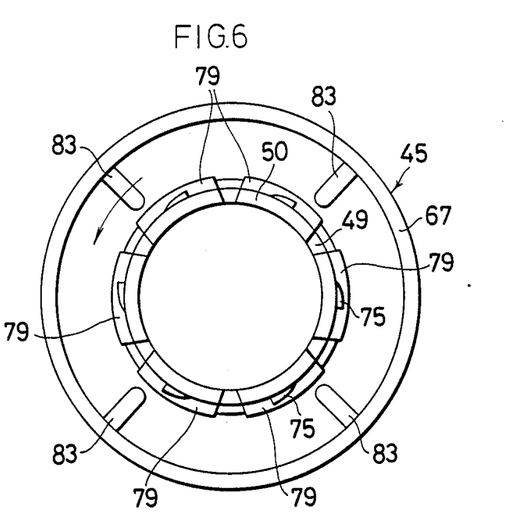
FIG. 6 is a rear view of the cap cover shown in FIG. 5.

FIGS. 5 and 6 show details of the cover 45 wherein reference numeral 75 designates the convex section formed along the outer periphery of the sleeve 50 and reference numeral 79 designates the convex section to fit in the concave section 77.

Further, in the instant embodiment, there are formed four projections 83 inside the top plate 67 at a position between the sleeve 50 and the side wall 67 of the cover 45 as shown in FIGS. 1, 2, 5 and 6. These projections are spaced radially from one another by 90 degrees with respect to the center of the cover 45 and one end of each of the projections 83 is located above the groove 81 of the flange 50 of the cap body 44.

The fuel tank cap of the above structure has various advantages that due to the provision of the idle-rotation mechanism for causing the cover 45 to rotate against a clamping torque larger than a predetermined value, the torque generating at the time of fitting the cap on the filler neck can be controlled and further, when an external force exceeding a predetermined value is applied on the cover 45 at the time of an accident, the sleeve 50 of the cover 45 deforms with ease through the slits 49 so that the convex sections 75 are disengaged from the concave sections 75 to allow only the cover 45 to separate easily from the cap body 44 while the cap body 44 is held engaged with the filler neck 59, thereby preventing the leakage of oil from the tank.

Further, the tank cap quarantees the accurate fitting of the convex section 79 formed on the outer periphery of the sleeve 50 into the concave section 77 formed on the inner periphery of the hole 47 of the cap body 44.

Accordingly, with the exception of a case in which a large impact is applied on the cap as at a car crash, it is possible to securely hold the cover 45 to the cap body 44.

Figure 7:
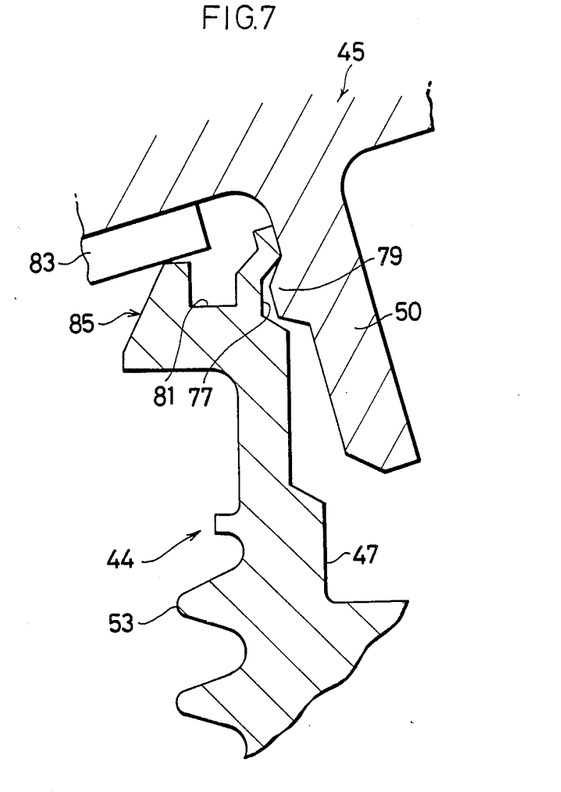
FIGS. 7 and 8 are illustrations of states in which the cover of the cap in FIG. 1 is inclined.

That is, in the case of the above fuel tank cap, when a force inclined with respect to the axis of the cover 45 is applied on the cap as shown in FIG. 7, the cover 45 and the annular concave section 77 of the cap body 44 deform elastically as shown so that the cover 45 is elastically supported through the annular concave section 77 and easy separation of the cover 45 from the cap body 44 is effectively separated.

As a result, even when a tensile force is applied on the cover 45 when the cover 45 is rotated by holding the side wall 67 of the cover 45 instead of the handle 71 and beings to rotate idly, the cover 45 does not become disengaged from the cap body 44 with ease.

Further, even when a force eccentric with the axis of the cover 45 in a state in which the cover 45 is rotated by the handle 71 and the cover begins to rotate idly, the cover 45 does not become disengaged from the cap body 44.

Figure 8:
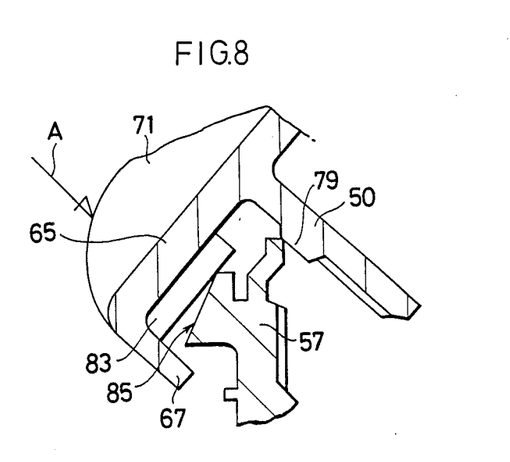

Besides the above advantages, since the instant embodiment is provided with the four projection 83 inside the top plate 65 at position located between the sleeve 50 of the cover 45 and the side wall 67 radially at intervals of 90 degrees with respect to the center of the cover 45, when a load is applied on the cover 45 from a direction off to the upper right thereof at the time of a car crash as designated by the arrow A in FIG. 8, the cover 45 inclines to cause the upper end of the flange 57 to come into contact with one of the projections 83 on the top plate 65 and the load concentrates on the projection. Therefore, no direct concentrated force is applied on the cover 45 thereby overcoming the problem of rupture of the cover 45.

Moreover, the flange 57 of the instant embodiment is provided with an inclined surface 85 along the upper portion of the outer periphery thereof, the projections 83 of the cover 45 can be securely disengaged from the cap body 44 as they move downward along the inclined surface.

Figure 9:
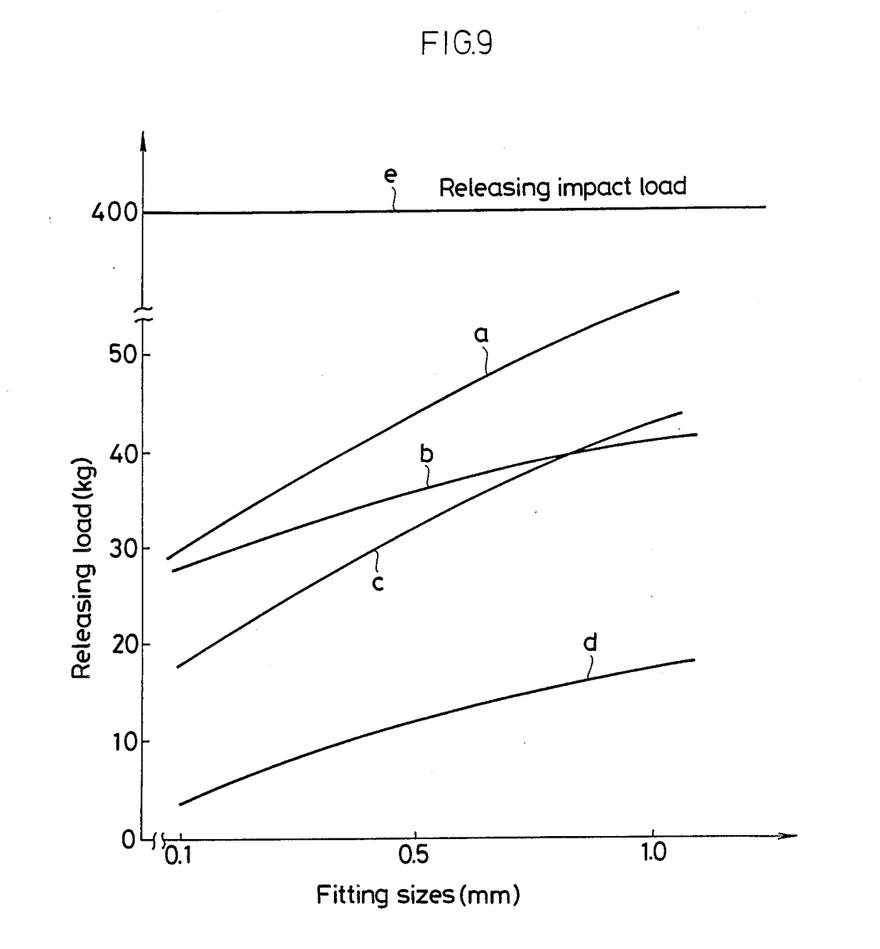
FIG. 9 is a graph showing relationships between cap releasing loads and fitting sizes.

FIG. 9 is a graph showing relationships between cap releasing loads and fitting sizes wherein values of the releasing loads are taken along the axis of ordinate and values of the fitting sizes are taken along the axis of abscissa.

It is notes that the term "fitting sizes" used herein means the radial height of the convex section 75 on the cover 45.

In FIG. 9, the curve "a" designates a cap releasing load applied on the cover 45 in the axial direction and the curve "b" designates one applied in a direction aslant to the axis of the cover 45.

Further, the curve "c" designates a cap releasing load applied on the cover 13 of the conventional cap shown in FIG. 10 in the axial direction and the curve "d" designates a cap releasing load applied on the same cap in a direction aslant to the axis thereof.

The straight line "e" designates a standardized or reference releasing impact load.

As will be clear from the above figure, it is possible with the present invention to sharply increase a cap releasing load over the conventional fuel tank cap when the load is applied on the cover 45 in the axial direction and in a direction aslant to the axis of the cover 45.

It should be noted that although the present invention has been described with reference to the above-described embodiment in which the annular concave section 77 is formed along the inner periphery of the hole 47 in the cap body 44 and the convex section 79 is formed on the outer periphery of the sleeve 50, the invention is not always limited thereto but it is of course possible to provide the convex section along the inner periphery of the hole 47 and the concave section along the outer periphery of the sleeve.

Further, although the above embodiment has been described as having the plurality of concave sections 73 formed along the inner periphery of the hole 47 and the convex sections 75 on the outer periphery of the sleeve 50, the present invention is not always limited to such embodiment but they may of course be formed in a reversed fashion.

What is claimed is:

1. In a fuel tank cap comprising a body provided with a hole in the upper portion thereof, said hole being provided with a plurality of concave or convex sections formed along the inner periphery thereof; and a cover including a sleeve formed on the inner periphery thereof so as to be inserted into said hole of said body and having a plurality of axial slits, said sleeve being provided with a plurality of convex or concave sections formed along the outer periphery thereof so as to mate with the concave or convex sections of said hole, respectively, whereby when a clamping torque applied on the cap exceeds a predetermined value, an idle-rotation mechanism is established between said sleeve and said hole, the improvement characterized in that an annular concave or convex section is formed along the inner periphery of said hole of said body and an annular convex or concave section is formed along the outer periphery of said sleeve so as to mate with said annular concave or convex section of said hole.

2. In a fuel tank cap comprising a body provided with a flange in the upper portion thereof, said flange being provided with a plurality of concave or convex sections along the inner periphery thereof; and a cover formed of a top plate and a side wall and provided with a sleeve formed on the inner periphery thereof and having a plurality of axial slits, said sleeve being provided with a plurality of convex or concave sections along the outer periphery thereof so as to mate with said concave or convex sections of said flange, whereby when a clamping torque applied on the cap exceeds a predetermined value, an idle-rotation mechanism is established between said flange and said sleeve, between said flange and said sleeve, the improvement characterized in that a plurality of projections are provided inside the top plate of said cover at positions between said sleeve and said side wall and an intervals of a predetermined angle with respect to the center of said cover.

* * * * *